United States Patent [19]

Dinse

[11] Patent Number: 4,980,963
[45] Date of Patent: Jan. 1, 1991

[54] TOOL CHANGING APPARATUS

[76] Inventor: Wilhelm Dinse, Königsreihe 12, D-2000 Hamburg 70, Fed. Rep. of Germany

[21] Appl. No.: 501,750

[22] Filed: Mar. 30, 1990

[30] Foreign Application Priority Data

Apr. 5, 1989 [DE] Fed. Rep. of Germany ....... 3911461

[51] Int. Cl.$^5$ .................. B23Q 3/155; B66C 1/00; B25J 15/00
[52] U.S. Cl. .................. 29/568; 279/1 F; 414/730; 901/30
[58] Field of Search .................. 29/568; 414/729, 730; 901/30, 41, 45; 294/87.2, 86.4; 279/82, 76, 1 F, 1 TS

[56] References Cited

U.S. PATENT DOCUMENTS

| | | | |
|---|---|---|---|
| 4,488,241 | 12/1984 | Hutchins et al. | 901/41 X |
| 4,512,709 | 4/1985 | Hennekes et al. | 294/86.4 X |
| 4,636,135 | 1/1987 | Baucon | 414/730 |
| 4,664,588 | 5/1987 | Newell et al. | 901/41 X |
| 4,710,093 | 12/1987 | Zimmer et al. | 414/730 |
| 4,763,401 | 8/1988 | Marinoni | 29/568 |
| 4,784,421 | 11/1988 | Alvite | 29/568 X |

Primary Examiner—William Briggs
Attorney, Agent, or Firm—Staas & Halsey

[57] ABSTRACT

An apparatus for fixing and changing tools on movable working machines, e.g. robot arms, comprising a retaining element (A) with a fixing trunnion (2) fixed to the working machine part and on which are formed retaining groove (4) at right angles to its axis; a fixing element (B) fixed to the tool and having a reception opening (9) for the fixing trunnion (2) and with fixing slides (6) engaging positively in the retaining grooves (4) and displaceable in the direction of the latter in opposition to the tension of springs (7) and which have in each case one fixing opening (8) aligned in the tool change position with the reception opening (9); a change element (C) for receiving the locking element (B) in the change position with a motor (operating cylinder (13)) displaceable change fork (14) for moving the fixing slides (6) out of the fixing position and into the change position in opposition to the tension of springs (7).

5 Claims, 1 Drawing Sheet

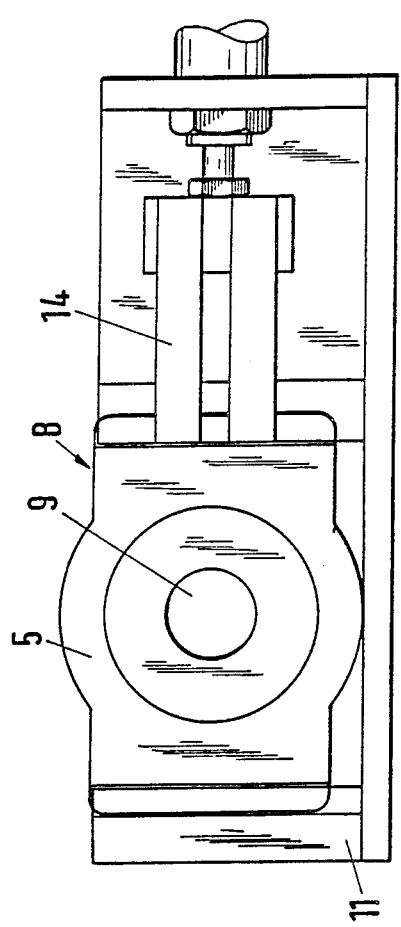
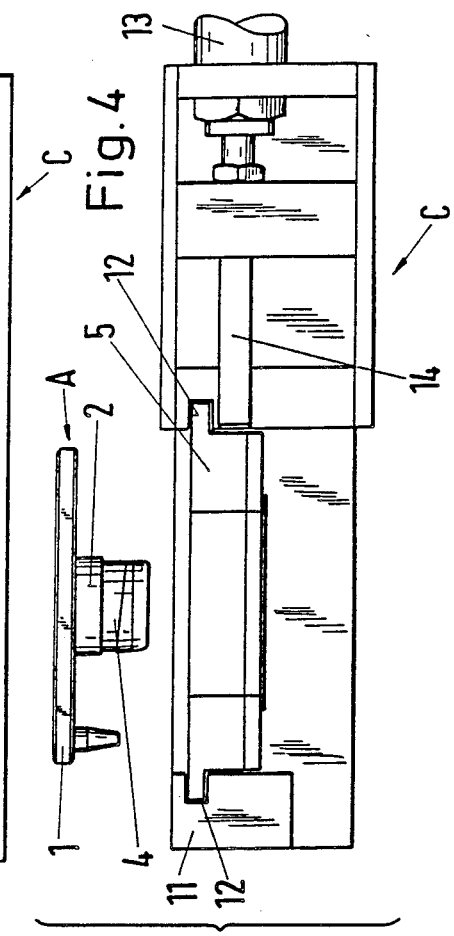
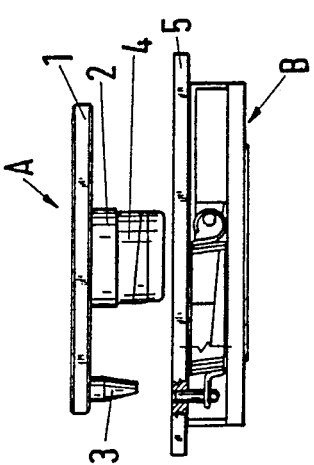
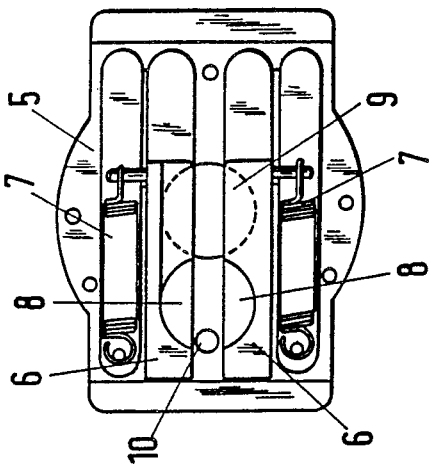

4,980,963

TOOL CHANGING APPARATUS

BACKGROUND OF THE INVENTION

The invention relates to an apparatus for fixing and changing tools on movable working machines, e.g. robot arms.

Numerous different constructional forms of such changing and fixing apparatuses are known. They are used for fixing and changing the most varied tools on a working machine part in a very fast and easy manner from the working sequence standpoint. If e.g. electric or plasma welding equipment has to be rapidly fixed and changed on a robot hand of a robot arm, use is made of the aforementioned apparatuses. The apparatuses comprise a retaining element, which is fixed to the robot hand and a fixing or clamping element, which is fixed to each tool to be used and also change elements, in which the tool to be changed is placed and from which a new tool is made ready for reception and fixing.

SUMMARY OF THE INVENTION

The problem of the invention is to provide an apparatus of the aforementioned type, which permits a rapid, but reliable fixing and changing of tools, whilst having a limited overall height. Locking takes place automatically and mechanically without tubes and lines being used.

This problem is fundamentally solved by features (a), (b) and (c) of claim 1.

On the retaining element of the apparatus according to the invention is provided a fixing trunnion, which is located in the reception opening of the fixing element in the fixing or locking position. The retaining grooves are formed in the fixing trunnion. The fixing slides, which are reliably secured by springs in the fixing position engage in said retaining grooves. For changing purposes the fixing element is moved towards the change element and is held by the latter. The fixing slides are moved out of the retaining grooves in opposition to the action of springs, so that the machine part with the retaining element can be moved away from the tool and towards a new tool. This is followed by the fitting of the retaining part with its fixing trunnion in reverse order in the fixing element of a new tool.

Advantageous developments are protected by claims 2 to 5.

BRIEF DESCRIPTION OF THE DRAWINGS

The invention is described in greater detail hereinafter relative to a non-limitative embodiment and the attached drawings, wherein show:

FIG. 1 a side view of a retaining element and a fixing element shortly prior to the connection thereof.

FIG. 2 a view of the fixing element of FIG. 1 from below.

FIG. 3 a view of a change element with a fixing element located therein.

FIG. 4 a side view of the change element according to FIG. 1 with the fixing element and a retaining element positioned above the same shortly prior to connection or shortly after separation.

DETAILED DESCRIPTION OF THE INVENTION.

The apparatus shown in the drawings comprises three fundamental elements:

1. a retaining element A, which is fixed to the not shown robot hand of a working machine;
2. a fitting element B, to whose underside is fixed a not shown tool, e.g. a welding apparatus;
3. a change element C, which connects together and separates the two elements A and B.

The retaining element A comprises a base plate 1 with a fixing trunnion 2 and a dowel 3 arranged eccentrically to the latter. Two retaining grooves 4 are formed facing one another on the cylindrical surface of the fixing trunnion 2 and, as is shown in FIG. 1, they are wedge-shaped.

The fixing element B comprises a frame 5, which carries the individual components. Two fixing slides 6 are arranged in mirror symmetrical manner to one another on frame 5 and are displaceable at right angles to the trunnion axis. Each fixing slide 6 is held by a spring 7, which forces the slides into the fixing or locking position. As is apparent from FIG. 2, in the locking position the fixing slide is to the left. A reception opening 9 for receiving the fixing trunnion 2 is formed in the fixing frame 5. There is also a dowel hole 10 for the dowel 3. A correct-angle positioning results from the arrangement of the dowel 3 in the dowel hole 10. In each fixing slide 6 is provided an, in this embodiment, approximately semicircular fixing opening 8, which is aligned in the change position with the reception opening 9, so that the trunnion 2 is freely movable in the direction of its axis.

The change element C comprises a frame, in which are formed parallel rails 12. An operating cylinder is also provided and can move the change fork 14 backwards and forwards. The change fork 14 is so dimensioned and constructed that it cooperates with the fixing slides 6.

In operation the apparatus functions in such a way that the robot arm with the retaining element A fixed to its robot hand and the fixing element B in turn fixed thereto moves with the tool into a change element C if the tool is to be replaced.

Fixing element B is inserted into rails 12. Operating cylinder 13 is operated, so that the change fork 14 moves the fixing slide 6 out of the position shown in FIG. 2, in opposition to the tension of spring 7, and into a position in which the portions of the clamping slides acting as wedges are disengaged from the retaining grooves 4. The fixing openings 8 are aligned in this position with the reception opening 9. The fixing trunnion is then free, so that it can be moved out of the reception opening 9.

When this has taken place the robot arm with the retaining element A is moved to a further change element C, where a new fixing element B with another tool is ready. The operating cylinder 13 is energized in such a way that the change fork 14 has advanced the fixing slides against the action of the springs, so that the fixing trunnion 2 can be moved into the aligned openings 8 and 9. The change fork 14 is then moved back into the starting position. The fixing slides 6 are drawn by springs 7 into the locking or fixing position and the new tool is fixed to the robot arm. The fixing element with the new tool can then be moved out of the change element and can perform its intended functions.

In practice, there are always at least two change elements, one to receive the tool to be changed with the associated fixing element and one in order to make ready the new tool with its fixing element. If several tools are to be made ready, a corresponding number of change elements is needed.

The three elements A,B and C and in particular the retaining element and the fixing element, have a limited overall height. All the tubes and lines lead directly to the tool. The apparatus can be easily and reliably operated and the locking action is positive, so that unintentional loosening or release is impossible. The retaining grooves are wedge-like, i.e. they taper in the direction of the tension of springs 7.

What is claimed is:

1. An apparatus for fixing and changing tools on movable working machines, e.g. robot arms, comprising
   (a) a retaining element (A) with a fixing trunnion (2) fixed to the working machine part and on which are formed retaining grooves (4) at right angles to its axis;
   (b) a fixing element (B) fixed to the tool and having a reception opening (9) for the fixing trunnion (2) and with fixing slides (6) engaging positively in the retaining groove (4) and displaceable in the direction of the latter in opposition to the tension of springs (7) and which have in each case one fixing opening (8) aligned in the tool change position with the reception opening (9);
   (c) a change element (C) for receiving the locking element (B) in the change position with a motor (operating cylinder (13) displaceable change fork (14) for moving the fixing slides (6) out of the fixing position and into the change position in opposition to the tension of springs (7).

2. An apparatus according to claim 1, wherein a dowel (3) is arranged eccentrically to the fixing trunnion (2) on the retaining element (A).

3. An apparatus according to claim 1, wherein the two fixing slides (6) are constructed in mirror symmetrical manner and each is arranged displaceably on one side of the reception opening (9) at right angles to its axis and wherein the fixing opening (8) has approximately half the cross-sectional surface of the reception opening (9).

4. An apparatus according to claim 1, wherein each retaining groove (4) is constructed in wedge-like manner in such a way that it tapers in the fixing direction (tension direction of springs (7).

5. An apparatus according to claim 1, wherein rails (12) for receiving the fixing element (B) in the change position are provided in a frame (11) of change elements (C).

* * * * *